US008470429B2

(12) United States Patent

Kurokawa et al.

(10) Patent No.: US 8,470,429 B2

(45) Date of Patent: Jun. 25, 2013

(54) OPTICAL RECORDING MEDIUM

(75) Inventors: Kotaro Kurokawa, Kanagawa (JP); Shigeki Takagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/185,062

(22) Filed: Jul. 18, 2011

(65) Prior Publication Data

US 2012/0027979 A1 Feb. 2, 2012

(30) Foreign Application Priority Data

Jul. 29, 2010 (JP) ................................ 2010-170887

(51) Int. Cl.
*G11B 7/24* (2006.01)

(52) U.S. Cl.
USPC ....... 428/64.1; 428/64.4; 428/64.5; 428/64.6; 430/270.13

(58) Field of Classification Search
USPC .................................... 428/64.4; 430/270.13
See application file for complete search history.

(56) References Cited

U.S. PATENT DOCUMENTS

| | | | | |
|---|---|---|---|---|
| 7,485,356 B2 * | 2/2009 | Shingai et al. | ............... | 428/64.4 |
| 8,133,565 B2 * | 3/2012 | Kiyono et al. | ............... | 428/64.1 |
| 8,133,566 B2 * | 3/2012 | Nishihara et al. | ............ | 428/64.1 |
| 2004/0105182 A1 | 6/2004 | Nishihara et al. | | |

FOREIGN PATENT DOCUMENTS

WO 03/025922 3/2003

* cited by examiner

*Primary Examiner* — Elizabeth Mulvaney
(74) *Attorney, Agent, or Firm* — Dentons US LLP

(57) ABSTRACT

An optical recording medium includes a support substrate, and a semi-transmissive recording layer including a first dielectric layer, a semi-transmissive semi-reflective layer, a second dielectric layer, a phase-change recording material layer, and a third dielectric layer which are laminated in that order from the support substrate side. The semi-transmissive semi-reflective layer is composed of silver, and the first dielectric layer includes a composite oxide layer using niobium oxide.

5 Claims, 6 Drawing Sheets

1-2

OPTICAL RECORDING MEDIUM

BACKGROUND

The present disclosure relates to an optical recording medium, and particularly to a phase-change optical recording medium including a plurality of laminated recording layers.

A phase-change optical recording medium is common as one of optical recording media capable of recording, reproducing, erasing information by laser irradiation. In the phase-change optical recording medium, information is recorded, reproduced, and erased by using transition between crystal and amorphous phases or between different crystal phases. Examples of commercial products of the phase-change optical recording medium include CD-RW (Compact Disc-Rewritable), DVD-RW (Digital Versatile Disc-Rewritable), DVD-RAM (Digital Versatile Disc-Random Access Memory), and Blu-ray Disc. In recent years, a configuration (two-layer disc) including a plurality of laminated recording layers has been put in practical use in order to increase storage capacity.

The above-described phase-change optical recording medium has the following double-layer disc structure. That is, the optical recording medium has a layer structure in which a first recording layer is formed on a support substrate, a second recording layer is formed on the first recording layer through an intermediate layer transparent to a recording/reproduction wavelength, and a light-transmitting protective layer transparent the recording/reproduction wavelength is formed on the second recording layer. A laser beam used for record/reproduction is incident on an optical recording medium from the light-transmitting protective layer side through an objective lens. The laser beam transmitted through the objective lens is condensed on the first recording layer or the second recording layer to record/reproduce information.

The double-layer disc has a configuration in which the second recording layer is formed as a semi-transmissive recording layer having the light-transmitting performance for recording/reproduction in the first recording layer. The second recording layer includes a dielectric, a metal, and a phase-change recording material which are laminated so as to exhibit the recording/reproducing performance. A typical layer structure includes a dielectric layer, a metal reflective layer, a dielectric layer, a phase-change recording material layer, and a dielectric layer which are laminated in that order from the substrate side. In addition, the second recording layer is designed by imparting a transmittance of about 45% to 55% so that the first recording layer are equal to those of the second recording layer coincide with each other with respect to the recording/reproducing power and reflectance as viewed from an optical disc recording/reproducing apparatus (drive).

As a method for imparting such high light transmittance to the second recording layer (semi-transmissive recording layer), there has been proposed a configuration in which among the layers constituting the second recording layer (semi-transmissive recording layer), the dielectric layer disposed on the substrate side of the metal reflective layer is formed as a transmittance controlling layer by using a material having a predetermined refractive index. Examples of such a material include $TiO_2$, $ZrO_2$, ZnO, $Nb_2O_5$, $Ta_2O_5$, $SiO_2$, $Al_2O_3$, $Bi_2O_3$, Ti—N, Zr—N, Nb—N, Ta—N, Si—N, Ge—N, Cr—N, Al—N, Ge—Si—N, Ge—Cr—N, and ZnS. These materials may be used as a mixture (refer to International Publication No. 03/025922 pamphlet).

SUMMARY

In the above-described optical recording medium, development of a three-layer disc including three recording layers and a four-layer disc including four recording layers is proceeding for further increasing the storage capacity. In the three-layer disc and four-layer disc, a semi-transmissive recording layer disposed on the laser incidence side is desired to have higher light transmittance than that of the semi-transmissive recording layer of the two-layer disc.

In order to realize such high light transmittance, the phase-change recording material layer and the metal reflective layer which constitute the semi-transmissive recording layer tend to be thinned. However, thinning of these layers reaches a limit, and further thinning causes the occurrence of defects and deterioration of recorded/reproduced signal characteristics.

It is desirable to provide an optical recording medium capable of further increasing the storage capacity by improving light transmittance while suppressing the occurrence of defects in a semi-transmissive recording layer.

The present disclosure relates to a phase-change optical recording medium including a plurality of laminated recording layers including a semi-transmissive recording layer. A phase-change optical recording medium according to an embodiment of the present disclosure includes a support substrate and a semi-transmissive recording layer including a first dielectric layer, a semi-transmissive semi-reflective layer, a second dielectric layer, a phase-change recording material layer, and a third dielectric layer which are laminated in that order from the support substrate side. In particular, the semi-transmissive semi-reflective layer is composed of silver, and the first dielectric layer in contact with the semi-transmissive semi-reflective layer includes a complex oxide layer using niobium oxide.

In the optical recording medium configured as described above, as described in detail below in Examples, it was confirmed that an attempt can be made to improve light transmittance while suppressing the occurrence of defects in the semi-transmissive recording layer.

According to an embodiment of the present disclosure, it is possible to realize an increase in the number of layers laminated in a semi-transmissive recording layer in a phase-change optical recording medium including a plurality of laminated recording layers including the semi-transmissive recording layer, thereby further increasing the storage capacity.

DETAILED DESCRIPTION OF EMBODIMENTS

Figure 1:
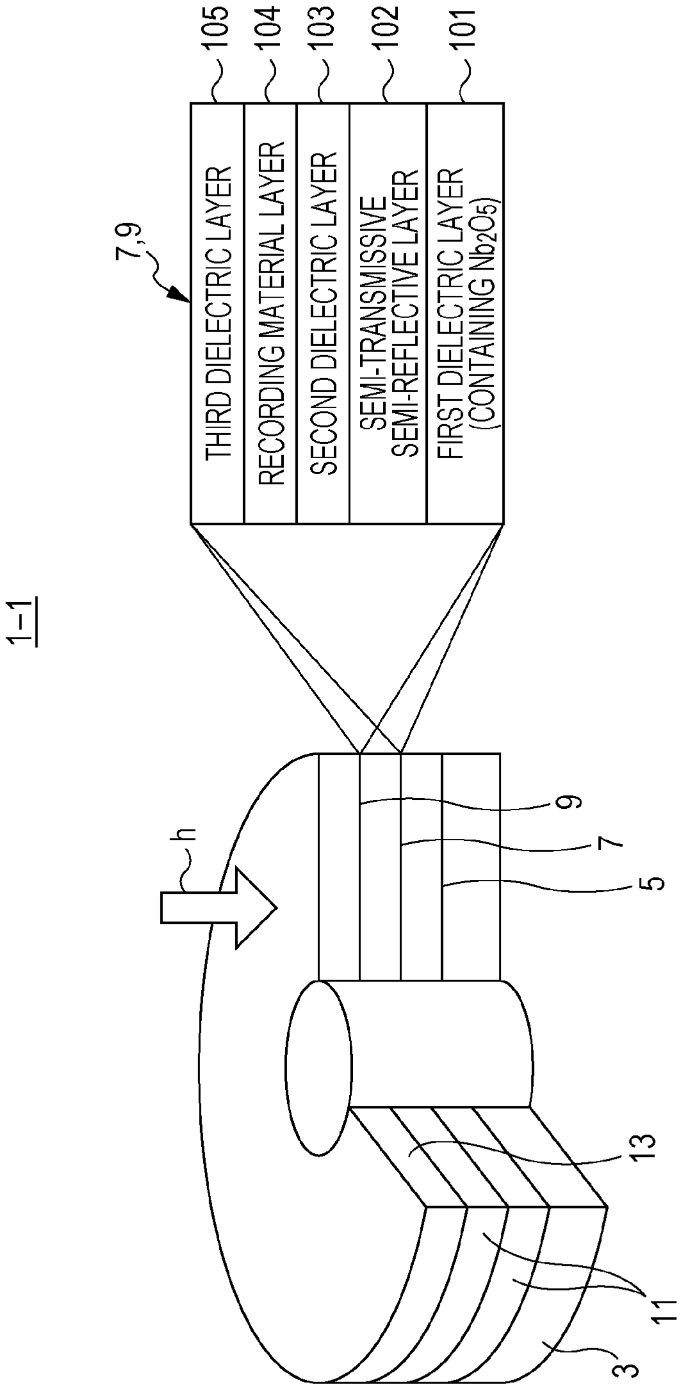
FIG. 1 is a schematic view showing a structure of an optical recording medium according to a first embodiment of the present disclosure.

Embodiments of the present disclosure are described in the following order on the basis of the drawings of the embodiments.

1. First embodiment (a complex oxide is used in a first dielectric layer on the support substrate side in a semi-transmissive recording layer)
2. Second embodiment (in the configuration of the first embodiment, a first dielectric layer has a laminated structure)
3. Third embodiment (in the configuration of the second embodiment, a third dielectric layer on the transparent protective film side has a laminated structure)

In the description below of phase-change optical recording media according to the embodiments, the same component is denoted by the same reference numeral, and duplicate description is omitted.

First Embodiment

FIG. 1 is a schematic view showing a configuration of an optical recording medium 1-1 according to a first embodiment. The optical recording medium 1-1 shown in this figure is a phase-change optical recording medium including a plurality of laminated recording layers. In particular, the first embodiment includes a first dielectric layer constituting a semi-transmissive recording layer, the first dielectric layer disposed nearest to a support substrate. Although a configuration including three laminated recording layers is described as an example here, the number of laminated recording layers is not limited to this, and a layer structure including two recording layers or four or more recording layers may be used.

The optical recording medium 1-1 includes a support substrate 3, a plurality of recording layers 5, 7, and 9 laminated on the support substrate 3, transparent intermediate layers 11 disposed between the respective recording layers 5, 7, and 9, and a transparent protective film 13 disposed at the top. The recording layers 5, 7, and 9 includes the reflective recording layer 5 provided directly on the support substrate 3 and the semi-transmissive recording layers 7 and 9 provided on the side nearer to the transparent protective film 13. That is, the support substrate 3, the reflective recording layer 5, the intermediate layer 11, the semi-transmissive recording layer 7, the intermediate layer 11, the semi-transmissive recording layer 9, and the transparent protective film 13 are laminated in that order from the support substrate 13 side. In the case of four or more recording layers, a semi-transmissive recording layer is further laminated between the semi-transmissive recording layer 9 and the transparent protective film 13 with an intermediate layer provided therebetween.

The optical recording medium 1-1 uses, for example, a laser beam at a wavelength of 400 to 410 nm for recording/reproduction, the laser beam being incident on the transparent protective film 13 side. The laser beam h emitted from a disc recording/reproducing apparatus and incident on the transparent protective film 13 side is condensed in the reflective recording layer 5 or the semi-transmissive recording layers 7 and 9 according to focus control on the disc recording/reproducing apparatus side, thereby recording/reproducing information. The configuration of each of the layers is described below.

<Support Substrate 3>

The support substrate 3 is composed of plastic such as polycarbonate or the like, or glass.

<Reflective Recording Layer 5>

The reflective recording layer 5 includes a phase-change recording material layer and a reflective layer having a thickness sufficient to reflect the laser beam h used for recording/reproduction. The reflective recording layer 5 includes at least a reflective layer, a dielectric layer, a phase-change recording material layer, and a dielectric layer laminated in that order from the support substrate 3 side. The recording material layer may be formed using a phase-change recording material, and for example, a material selected from the materials for the semi-transmissive recording layers 7 and 9 described below may be used.

<Semi-Transmissive Recording Layers 7 and 9>

The semi-transmissive recording layers 7 and 9 each include a first dielectric layer 101 characteristic of the first embodiment. The semi-transmissive recording layers 7 and 9 each include a phase-change recording material layer 104 and a semi-transmissive semi-reflective layer 102 which reflects and transmits the laser beam h used for recording/reproduction. As shown in the drawing, the semi-transmissive recording layers 7 and 9 each include the first dielectric layer 101, the semi-transmissive semi-reflective layer 102, a second dielectric layer 103, the recording material layer 104, and a third dielectric layer 105 which are laminated in that order from the support substrate 3 side. In the first embodiment, the semi-transmissive recording layers 7 and 9 having such a laminated structure each include a material of the first dielectric layer 101 disposed nearest to the support substrate 3.

That is, the first dielectric layer 101 is formed as a complex oxide layer containing niobium oxide ($Nb_2O_5$). Another oxide contained, together with niobium oxide ($Nb_2O_5$), in the first dielectric layer 101 is preferably gallium oxide ($Ga_2O_3$) or zirconium oxide ($ZrO_2$). The thickness of the first dielectric layer 101 is controlled, together with the thicknesses of the other layers constituting each of the semi-transmissive recording layers 7 and 9, so as to achieve predetermined values of transmittances tc and ta and reflectances Rc and Ra of the laser beam h used for recording/reproduction. The transmittances tc and ta and the reflectances Rc and Ra are transmittances and reflectances in the respective phase states of each of the semi-transmissive recording layers 7 and 9 which change in phase by irradiation with the laser beam as described below.

The semi-transmissive semi-reflective layer 102 is composed of a metal thin film. For example, the semi-transmissive semi-reflective layer 102 is composed of a thin film of silver (Ag) or a silver alloy, and the transmittance, reflectance, and heat radiation rate of the laser beam are controlled by controlling the thickness of the thin film. When a silver alloy is used, for example, Nd, Pd, or Cu is used as a material other than silver (Ag).

The second dielectric layer 103 is formed using $Al_2O_3$, $Bi_2O_3$, $CeO_2$, $Cr_2O_3$, $Ga_2O_3$, $In_2O_3$, MgO, $Nb_2O_5$, SiN, $SiO_2$, $SnO_2$, $TiO_2$, or ZnS—$SiO_2$ according to the characteristics of the medium.

Also, the second dielectric layer 103 is not limited to a single-layer structure and may be a laminated structure including a plurality of laminated layers.

The recording material layer 104 is composed of a material which changes in phase by laser irradiation, and in further detail, a material controlled to a crystal or amorphous phase or a crystal 1 or crystal 2 phase by a cooling process after heating by laser irradiation. As such a material, a compound represented by the composition formula, $Ge_aSb_2Te_{a+3}$ or $Ge_aBi_2Te_{a+3}$ ($1 \leqq a \leqq 20$), is used. Such a compound is formed by finely controlling the amounts of germanium (Ge) and tellurium (Te) and used as a complex compound including two types. Further, in order to improve the recorded information storage performance or the like, an element appropriate for application may be appropriately added to the recording material layer 104 composed of this compound.

The third dielectric layer 105 is preferably formed using a material having a refractive index of 2.4 or more. Examples of such a material include niobium oxide ($Nb_2O_5$), titanium oxide ($TiO_2$), zinc sulfide (ZnS), cerium oxide ($CeO_2$), bismuth oxide ($Bi_2O_3$), silicon oxide ($SiO_x$), silicon nitride, and the like. These materials may be used alone or used as a complex compound of two or more. The third dielectric layer 105 is not limited to a single-layer structure and may be a laminated structure including a plurality of laminated layers.

The above-described semi-transmissive recording layers 7 and 9 have the light-transmitting performance so that the recording/reproduction laser beam incident on the transparent protective film 13 side reaches the reflective recording layer 5. In particular, the semi-transmissive recording layers 7 and 9 are designed so that the reflective recording layer 5 and the semi-transmissive recording layers 7 and 9 coincide with each other with respect to the recording/reproduction power and reflectance as viewed from a recording/reproducing apparatus (drive) which performs irradiation and pickup of the laser beam. Therefore, the semi-transmissive recording layers 7 and 9 are configured so that the layer disposed near to the transparent protective film 13 has higher light transmittance.

For example, in a configuration in which the three recording layers including the reflective recording layer 5 are laminated, the light transmittance of the semi-transmissive recording layer 7 on the support substrate 3 side is adjusted to about 45% to 550, and the light transmittance of the semi-transmissive recording layer 9 on the transparent protective film 13 side is adjusted to about 60%. Such adjustment is performed by controlling the thickness of each of the layers so as to achieve predetermined values of the light transmittance tc of the laser beam h used for recording/reproduction, the reflectance Rc of the recording material layer 104 in a crystal state, and the reflectance Ra of the recording material layer 104 in an amorous state. In addition, as described in Example 3 below, the composition of the first dielectric layer 101 is controlled.

Figure 2:
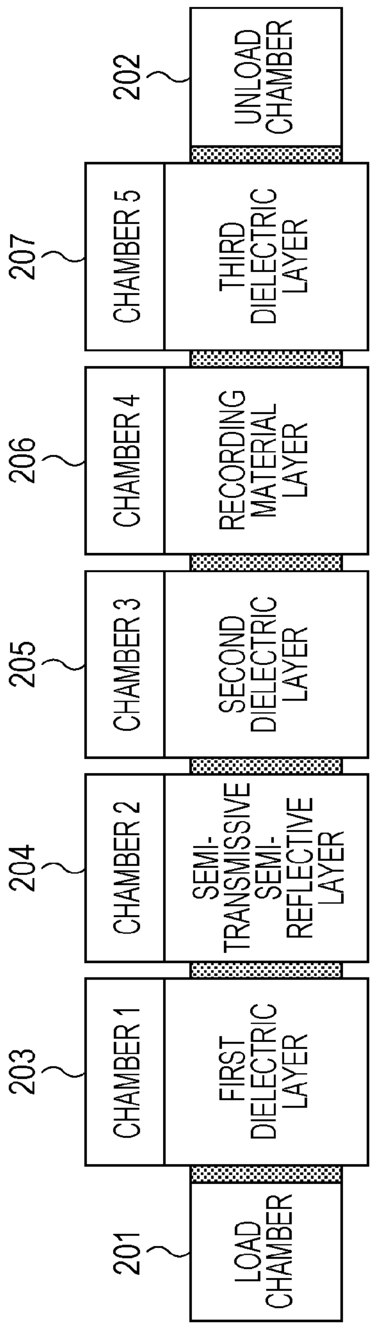
FIG. 2 is a configuration view of a sputtering apparatus used for forming a semi-transmissive recording layer.

The semi-transmissive recording layers 7 and 9 are formed by, for example, sputtering deposition. FIG. 2 is a schematic view showing a configuration of a sputtering deposition apparatus used for sputtering deposition. As shown in FIG. 2, the sputtering deposition apparatus includes a load chamber 201, an unload chamber 202, and deposition chambers 203 to 207 for depositing the respective layers of each of the semi-transmissive recording layers 7 and 9, the deposition chambers 203 to 207 being arranged in order between the load chamber 201 and the unload chamber 202. The load chamber 201, the deposition chambers 203 to 207, and the unload chamber 202 are connected to each other so that the support substrate can be successively moved while being maintained in a vacuum atmosphere.

When each of the semi-transmissive recording layers 7 and 9 is formed using the sputtering apparatus, the support substrate 3 is placed in the load chamber 201 after the reflective recording layer 5 and the intermediate layer 11 are formed on the support substrate 3. Next, the support substrate 3 is transferred to the deposition chamber 203 connected to the load chamber 201, and the lowermost first dielectric layer 101 is deposited. Then, the support substrate 3 is successively moved from the chambers 203 to 207 so that the layers from the first dielectric layer 101 to the third dielectric layer 105 are successively deposited in the deposition chambers 203 to 207. As a result, the first dielectric layer 101 to the third dielectric layer 105 are successively formed in order from the support substrate 3 side to form each of the semi-transmissive recording layers 7 and 9. In a sputtering apparatus, the load chamber 201 may also serve as the unload chamber 202.

<Intermediate Layer 11 and Transparent Protective Film 13>

The intermediate layers 11 and the transparent protective film 13 are each formed using a material having low absorption of the laser beam used for recording/reproduction. For example, a photocurable resin or a glass substrate and a resin substrate bonded together with a photocurable resin used as an adhesive may be used. The intermediate layers 11 provided in the optical recording medium 1-1 may have the same configuration or different configurations. In addition, the intermediate layers 11 and the transparent protective film 13 provided in the optical recording medium 1-1 may have the same configuration or different configurations.

In the above-described optical recording medium 1-1, as described in order in Examples 1 to 3 below, it was confirmed that in the semi-transmissive recording layers 7 and 9, an attempt can be made to improve the light transmittance while suppressing the occurrence of defects as compared with a general configuration using, for example, titanium oxide ($TiO_2$) in a first dielectric layer. Therefore, in the phase-change optical recording medium 1-1, when a plurality of the semi-transmissive layers 7 and 9 are laminated, a light transmittance can be secured, and the storage capacity can be further increased.

EXAMPLE 1

Assuming that a laser beam at a wavelength of 405 nm is used as a recording/reproduction wavelength, the semi-transmissive recording layer 7, 9 having the configuration described in the first embodiment was formed using each of various materials for the first dielectric layer 101. The semi-transmissive recording layer 7, 9 was formed on the intermediate layer 11 composed of a photocurable resin and was covered with the transparent protective film 13 composed of a photocurable resin.

The semi-transmissive recording layer was formed using the materials below in order from the support substrate side.

First dielectric layer 101 . . . Table 1 below (20 nm)

Semi-transmissive semi-reflective layer 102 . . . Ag alloy (10 nm)

Second dielectric layer 103 . . . ITO (refractive index: about 2.2, 6 nm)

Recording material layer 104 . . . GeBiTe recording material (6 nm)

Third dielectric layer 105 . . . SiN (10 nm)/$TiO_2$ (refractive index: about 2.65, 16 nm)

The GeBiTe recording material constituting the recording material layer 104 is a compound-type recording material and changes in phase between crystal and amorphous phases by laser irradiation.

TABLE 1

| First dielectric layer 101 | Light transmittance tc % | Initial defect density defects/$mm^2$ | Rate of defect increase defects/$mm^2$/day | Deposition rate nm/sec | Refractive index (wavelength 405 nm) |
|---|---|---|---|---|---|
| $TiO_2$ | 57.9 | 0.14 | 32.70 | 0.26 | 2.7 |
| $Nb_2O_5$ | 61.6 | 0.06 | 0.04 | 0.46 | 2.5 |
| $Ta_2O_5$ | 60.2 | 0.16 | 0.15 | 0.89 | 2.2 |
| SiNx | 58.7 | 0.09 | 0.08 | 0.50 | 2.1 |
| $ZrO_2$ | 58.0 | 0.06 | 0.09 | 0.40 | 2.2 |
| $Ga_2O_3$ | 54.8 | 0.10 | 0.02 | 0.54 | 1.9 |
| $SiO_2$ | 45.0 | 0.30 | 52.20 | 0.60 | 1.5 |

A reliability test was performed for the semi-transmissive recording layers 7, 9 formed as described above, and a defect density was measured before and after the reliability test. The reliability test was performed by a method of storing in an environment of 80° C. and 85% humidity for 200 hours. The light transmittance tc, the initial defect density, and the rate of defect increase of each of the measured semi-transmissive recording layers, and the deposition rate and refractive index (wavelength 405 nm) of the first dielectric layer 101 are also shown in Table 1 above.

Figure 3:
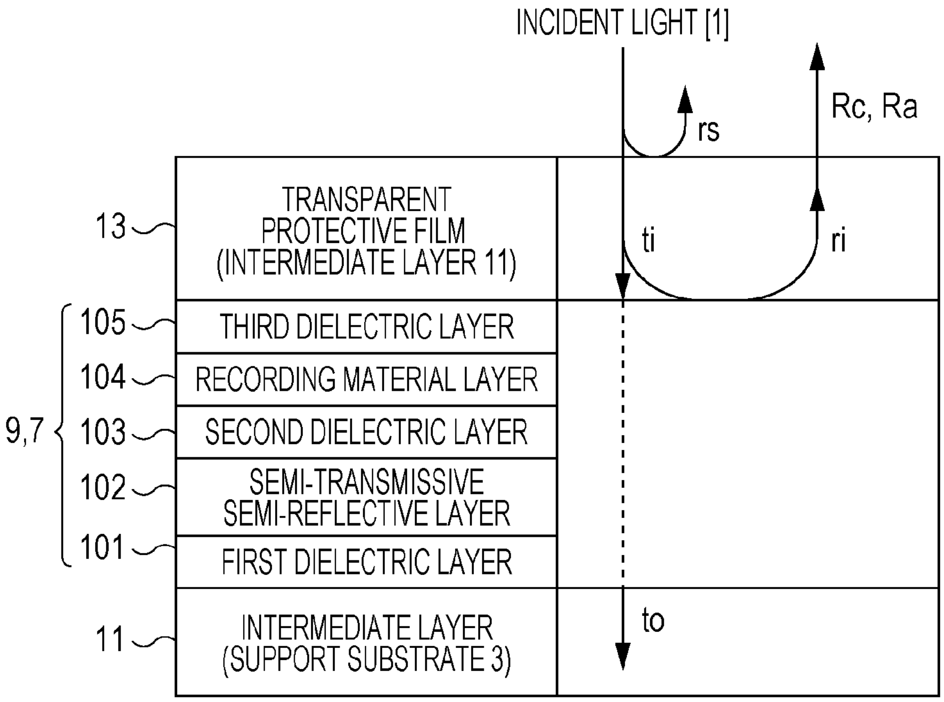
FIG. 3 is a schematic view illustrating optical characteristics of a semi-transmissive recording layer.

As shown in FIG. 3, the light transmittance tc is light transmittance of the semi-transmissive recording layer 7, 9 when the recording material layer 104 is in a crystal state. The light transmittance tc is tc=to/ti where ti is a light component incident on the semi-transmissive recording layer 7, 9, and to is a light component passed through the semi-transmissive recording layer.

The initial defect density is a number of defects in terms of the number per unit area immediately after the formation of the semi-transmissive recording layer. The rate of defect increase is an increase in number of defects per unit area in terms of an increase per unit time (1 day) before and after the reliability test. The number of defects for calculating the initial defect density and the rate of defect increase was measured with a defect inspection machine. In addition, the deposition rate of each of the materials constituting the first dielectric layer 101 is effective only in relative comparison because it depends on the sputtering apparatus.

According to Table 1, the four types, i.e., niobium oxide ($Nb_2O_5$), silicon nitride (SiN), zirconium oxide ($ZrO_2$), and gallium oxide ($Ga_2O_3$), were selected as materials having a light transmittance tc of 50% or more and an initial defect density and a rate of defect increase of two decimal places or less. For an optical recording medium including a plurality of recording layers including a semi-transmissive recording layer, the light transmittance of the semi-transmissive recording layer is preferably 50% or more. In addition, titanium oxide ($TiO_2$) generally used for a first dielectric layer has a very high refractive index but the light transmittance tc is not so high as expected. This is because the extinction coefficient of titanium oxide ($TiO_2$) may not be suppressed to zero.

EXAMPLE 2

Next, in the semi-transmissive recording layer 7, 9, consideration is given to a condition where the light transmittance tc and the reflectance ratio (so-called contrast Rc/Ra) before and after phase change of the recording material layer 104 are controlled by a composition ratio of a complex compound. In this case, the reflectance Rc is reflectance of the recording material layer 104 in a crystal state, and the reflectance Ra is reflectance of the recording material layer 104 in an amorphous state. As shown in FIG. 3, the reflectances Rc and Ra each represent a light component reflected by the semi-transmissive recording layer 7, 9 and again emitted from the transparent protective film 13 on the assumption that the incident laser beam incident on the transparent protective film 13 is [1].

Therefore, among the four materials selected as described above in Example 1, the three types, i.e., niobium oxide ($Nb_2O_5$), zirconium oxide ($ZrO_2$), and gallium oxide ($Ga_2O_3$), which easily form complex compounds, were selected. In particular, niobium oxide ($Nb_2O_5$) exhibiting the highest transmittance tc in Example 1 was used as a main material.

As shown in Table 2 below, each of the above-described selected materials was used for the first dielectric layer 101, and the semi-transmissive recording layer 7, 9 having the configuration described in Example 1 was formed on the support substrate 3. The configuration was the same as in Example 1 except the first dielectric layer 101.

TABLE 2

| First dielectric layer 101 | Initial defect density defects/$mm^2$ | Rate of defect increase defects/$mm^2$/day |
|---|---|---|
| $Nb_2O_5$ (80 mol %)/$Ga_2O_3$ (20 mol %) | 0.06 | 0.06 |
| $Nb_2O_5$ (80 mol %)/$ZrO_2$ (20 mol %) | 0.05 | 0.06 |
| $ZrO_2$ (80 mol %)/$Ga_2O_3$ (20 mol %) | 0.04 | 1.30 |

For the semi-transmissive recording layer 7, 9 formed as described above, the same reliability test as in Example 1 was performed to measure the initial defect density and the rate of defect increase. Table 2 also shows the measurement results.

According to Table 2, it was confirmed that with a complex compound of niobium oxide ($Nb_2O_5$) and gallium oxide ($Ga_2O_3$) or a complex compound of niobium oxide ($Nb_2O_5$) and zirconium oxide ($ZrO_2$), the initial defect density and the rate of defect increase are suppressed to two decimal places or less, and the semi-transmissive recording layer 7, 9 with high reliability can be formed. In contrast, with a complex compound of gallium oxide ($Ga_2O_3$) and zirconium oxide ($ZrO_2$), the rate of defect increase is worsened by about 2 digits as compared with a case using each of the materials singly.

From the above, it was confirmed that when the first dielectric layer 101 is formed using a complex compound containing niobium oxide ($Nb_2O_5$) and gallium oxide ($Ga_2O_3$) or zirconium oxide ($ZrO_2$), the occurrence of defects and an increase in defects in the semi-transmissive recording layer 7, 9 can be suppressed.

EXAMPLE 3

Next, with respect to the condition where the light transmittance tc of the semi-transmissive recording layer 7, 9 and the reflectance ratio (so-called contrast Rc/Ra) before and after phase change of the recording material layer 104 are controlled by the composition ratio of the complex compound constituting the first dielectric layer 101, it was confirmed as follows.

As shown in Tables 3 and 4 below, the first dielectric layer 101 was formed using at various composition ratios each of the complex compounds confirmed to suppress defects in Example 2. In addition, a simulation was made for the case in which the semi-transmissive recording layer 7, 9 having the configuration described in the first embodiment was formed on the support substrate 3. In this case, the reflectance Rc of the recording material layer 104 in a crystal state was fixed at Rc=3.0%, and the light transmittance tc of the semi-transmissive recording layer 7, 9 and the reflectance ratio (so-called contrast Rc/Ra) before and after the phase change of the recording material layer 104 were calculated. In order to fix the reflectance Rc at Rc=3.0%, the thickness of the first dielectric layer 101 was adjusted.

Figure 4:
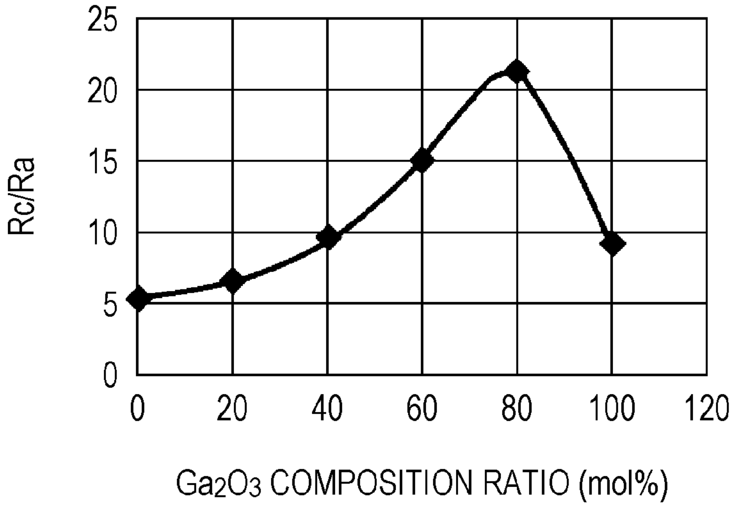
FIG. 4 is a graph showing the $Ga_2O_3$ composition ratio dependency of contrast (Rc/Ra) in a semi-transmissive recording layer, in which the $Ga_2O_3$ composition ratio represents the composition ratio when a $Nb_2O_5$—$Ga_2O_3$ complex oxide is used as a material of a first dielectric layer.
Figure 5:
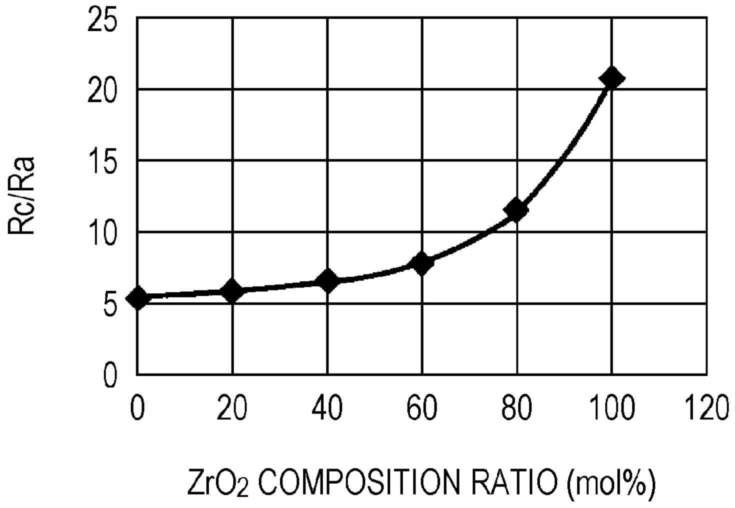
FIG. 5 is a graph showing the $ZrO_2$ composition ratio dependency of contrast (Rc/Ra) in a semi-transmissive recording layer, in which the $ZrO_2$ composition ratio represents the composition ratio when a $Nb_2O_5$—$ZrO_2$ complex oxide is used as a material of a first dielectric layer.

Tables 3 and 4 show the thickness of the thus-adjusted first dielectric layer 101 together with the refractive index of the dielectric layer (complex compound) at each composition ratio. FIG. 4 is a graph showing the reflectance ratios shown in Table 3, and FIG. 5 is a graph showing the reflectance ratios shown in Table 4.

TABLE 3

| $Ga_2O_3$ composition ratio mol % | Reflectance ratio Rc/Ra | Light transmittance tc % | Refractive index | Thickness nm |
|---|---|---|---|---|
| 0 | 5.3 | 61.1 | 2.56 | 22.0 |
| 20 | 6.8 | 60.5 | 2.48 | 23.3 |
| 40 | 9.5 | 59.5 | 2.39 | 25.2 |
| 60 | 15.3 | 58.0 | 2.28 | 28.0 |
| 80 | 21.1 | 58.5 | 2.21 | 29.5 |
| 100 | 9.3 | 51.6 | 1.90 | 38.0 |

TABLE 4

| $ZrO_2$ composition ratio mol % | Reflectance ratio Rc/Ra | Light transmittance tc % | Refractive index | Thickness nm |
|---|---|---|---|---|
| 0 | 5.3 | 61.1 | 2.56 | 22.0 |
| 20 | 5.8 | 60.9 | 2.53 | 22.5 |
| 40 | 6.6 | 61.9 | 2.49 | 23.3 |
| 60 | 8.1 | 59.9 | 2.43 | 24.4 |
| 80 | 11.7 | 58.9 | 2.35 | 26.2 |
| 100 | 20.8 | 56.8 | 2.20 | 30.0 |

As seen from Table 3 and FIG. 4, the optical characteristics of the semi-transmissive recording layer including the first dielectric layer 101 formed using the complex oxide containing niobium oxide ($Nb_2O_5$) and gallium oxide ($Ga_2O_3$) are as follows. The reflectance ratio Rc/Ra changes in the range of Rc/Ra=5.3 to 21.1 and peaks at a gallium oxide ($Ga_2O_3$) composition ratio of about 80 mol %. On the other hand, the light transmittance tc decreases within the range of tc=51.6 to 61.1 as the gallium oxide ($Ga_2O_3$) composition ratio increases.

As seen from Table 4 and FIG. 5, the optical characteristics of the semi-transmissive recording layer including the first dielectric layer 101 formed using the complex compound of niobium oxide ($Nb_2O_5$) and zirconium oxide ($ZrO_2$) are as follows. The reflectance ratio Rc/Ra changes in the range of Rc/Ra=5.3 to 20.8 and increases with changes in the zirconium oxide ($ZrO_2$) composition ratio. On the other hand, the light transmittance tc changes within the range of tc=56.8 to 61.9 and peaks at a zirconium oxide ($ZrO_2$) composition ratio of about 40 mol %.

The above results reveal that when the first dielectric layer 101 is composed of a complex of niobium oxide ($Nb_2O_5$) with gallium oxide ($Ga_2O_3$) or zirconium oxide ($ZrO_2$) instead of single niobium oxide ($Nb_2O_5$) having high light transmittance tc, good reflectance characteristics can be achieved in exchange for a slight decrease in transmittance.

In addition, when the first dielectric layer 101 is composed of a complex oxide, the refractive index, thermal conductivity, light transmittance, reflectance, thickness, etc. of the first dielectric layer can be finely adjusted by the composition of the complex oxide, thereby more finely improving the signal characteristics of the semi-transmissive recording layers 7 and 9. For example, the first dielectric layer 101 has the large influences on the reflectances Rc and Ra of the recording material layer 104 and is effective in adjusting the reflectance ratio Rc/Ra. The higher the reflectance ratio Rc/Ra, the more the S/N of reproduced signals is improved to produce good reproduced signal quality.

Specifically, it is found that the reflectance ratio Rc/Ra and the light transmittance tc can be controlled within wider ranges by using a complex oxide of niobium oxide ($Nb_2O_5$) and gallium oxide ($Ga_2O_3$) for the first dielectric layer 101. On the other hand, it is found that by using a complex oxide of niobium oxide ($Nb_2O_5$) and zirconium oxide ($ZrO_2$) for the first dielectric layer 101, the reflectance ratio Rc/Ra and the light transmittance tc can be controlled so that variation with variation in the composition ratio is suppressed to be smaller than in the case of $Ga_2O_3$.

Referring to Table 1, niobium oxide ($Nb_2O_5$), gallium oxide ($Ga_2O_3$), and zirconium oxide ($ZrO_2$) used for the first dielectric layer 101 have higher deposition rates than that of titanium oxide ($TiO_2$) frequently used for a first dielectric layer. Therefore, in the configuration of the first embodiment, the tact time taken for forming the semi-transmissive recording layers 7 and 9 each including the first dielectric layer 101 by sputtering deposition can be shortened. Such a decrease in the tact time can be realized without due to improvement in the deposition apparatus, and thus an increase in cost can also be suppressed.

In contrast, when the tact time taken for forming a semi-transmissive recording layer using titanium oxide ($TiO_2$) having a low deposition rate for the first dielectric layer, a configuration is used, in which a deposition chamber for the first dielectric layer is divided into a plurality of parts, and the parts are arranged in series to shorten the deposition time per deposition chamber. In this case, it is necessary to prepare a larger number of chambers than the number of material layers in the semi-transmissive recording layer, and thus the cost of capital investment is added to the price rate of an optical recording medium.

Second Embodiment

Figure 6:
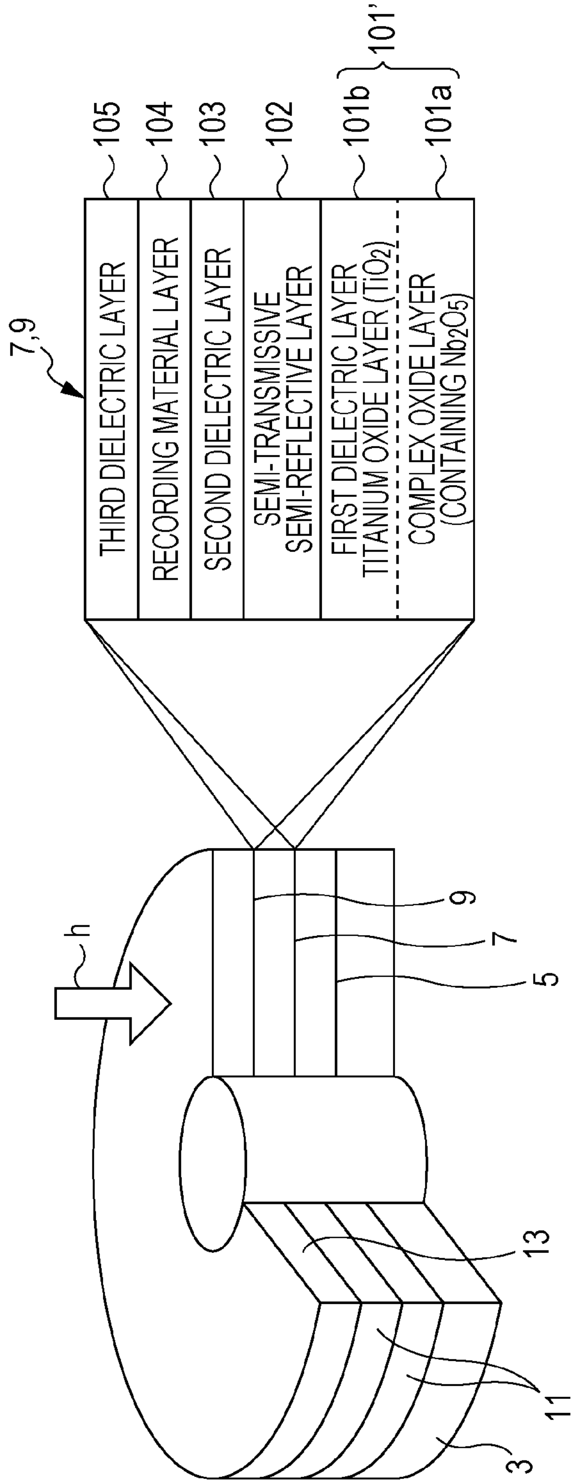
FIG. 6 is a schematic view showing a structure of an optical recording medium according to a second embodiment of the present disclosure.

FIG. 6 is a schematic view showing a configuration of an optical recording medium 1-2 according to a second embodiment. The optical recording medium 1-2 shown in this figure is different from the optical recording medium according to the first embodiment described with reference to FIG. 1 in that a first dielectric layer 101' in each of the semi-transmissive recording layers 7 and 9 has a double-layer structure. The other components are the same as in the first embodiment.

That is, the first dielectric layer 101' in each of the semi-transmissive recording layers 7 and 9 has a laminated structure in which a titanium oxide ($TiO_2$) layer **101*b* is provided at the semi-transmissive semi-reflective layer 102 side interface of a complex oxide layer 101*a* containing niobium oxide ($Nb_2O_5$). Namely, the first dielectric layer 101' includes the complex oxide layer 101*a* and the titanium oxide layer 101*b* which are laminated in that order from the support substrate 3** side.

The complex oxide layer **101*a* has the same configuration as the first dielectric layer 101** of the first embodiment and is composed of a complex oxide containing niobium oxide ($Nb_2O_5$) and gallium oxide ($Ga_2O_3$) or zirconium oxide ($ZrO_2$).

The thicknesses of the complex oxide layer **101*a* and the titanium oxide ($TiO_2$) layer 101*b* are adjusted, together with the thicknesses of the other layers constituting the semi-transmissive recording layers 7 and 9**, so as to achieve predetermined values of the light transmittance tc and reflectances Rc and Ra of the laser beam h used for recording/reproduction.

In the above-described configuration, the titanium oxide ($TiO_2$) layer 101*b* having different thermal conductivity from those of niobium oxide ($Nb_2O_5$), zirconium oxide ($ZrO_2$), and gallium oxide ($Ga_2O_3$), which constitute the complex oxide layer 101*a*, is provided adjacent to the semi-transmissive semi-reflective layer 102. As a result, the control range of thermophysical properties of the semi-transmissive layers 7 and 9 can be extended, a phase state in the recording material layer 104 can be easily controlled, and the recorded/reproduced signal quality can be improved.

As described below in Example 4, an increase in the rate of defect increase due to provision of the titanium oxide ($TiO_2$) layer 101*b* can be suppressed, and reliability can be secured.

EXAMPLE 4

The first dielectric layer 101' having the laminated structure shown in FIG. 6 described in the second embodiment was formed as configuration 1. As a comparison, a first dielectric layer having a single-layer structure without the titanium oxide ($TiO_2$) layer 101*b* in the configuration 1 was formed as configuration 2.

As shown in Table 5 below, in the configuration 1, the semi-transmissive layer 7, 9 with the configuration described in the second embodiment was formed on the support substrate 3 using the first dielectric layer 101 with a laminated structure including the complex oxide layer 101*a*, which was composed of each of the materials selected as described above, and the titanium oxide ($TiO_2$) layer 101*b*. The thickness of the complex oxide layer 101*a* was 21 nm, and the thickness of the titanium oxide ($TiO_2$) layer 101*b* was 2 nm. In the configuration 2, the titanium oxide ($TiO_2$) layer 101*b* was removed from the configuration 1. The configuration is the same as in Example 1 except the first dielectric layer 101'. For comparison, the semi-transmissive layer 7, 9 with a configuration in which the complex oxide layer 101*a* was replaced by a layer composed of only niobium oxide ($Nb_2O_5$) was formed.

TABLE 5

| | Rate of defect increase [defects/mm$^2$/day] | |
|---|---|---|
| Complex oxide layer 101a of first dielectric layer 101' | Structure 1 (with $TiO_2$) | Structure 2 (without $TiO_2$) |
| $Nb_2O_5$ (80 mol %)/$Ga_2O_3$ (20 mol %) | 0.07 | 0.07 |
| $Nb_2O_5$ (80 mol %)/$ZrO_2$ (20 mol %) | 0.07 | 0.08 |
| $Nb_2O_5$ | 0.06 | 0.07 |

For the semi-transmissive recording layers 7, 9 formed as described above, the same reliability test as in Example 1 was performed to measure the rate of defect increase. Table 5 also shows the results of measurement.

Table 5 indicates that even in the configuration 1 in which the first dielectric layer 101' has a laminated structure including the titanium oxide ($TiO_2$) layer 101*b*, the rate of defect increase is suppressed to the same extent as in the case of a first dielectric layer having a single-layer structure including a complex compound layer.

In the above-described configuration of the second embodiment, the first dielectric layer 101' includes the titanium oxide ($TiO_2$) layer 101*b* provided adjacent to the semi-transmissive semi-reflective layer 102. As a result, it was confirmed that it is possible to extend the control range of thermophysical properties of the semi-transmissive layers 7 and 9 while maintaining the effect of suppressing the occurrence of defects at the same level as in the first embodiment. Consequently, it was also confirmed that the recorded/reproduced signal quality in the optical recording medium 1-2 can be improved as compared with the configuration of the first embodiment.

Third Embodiment

Figure 7:
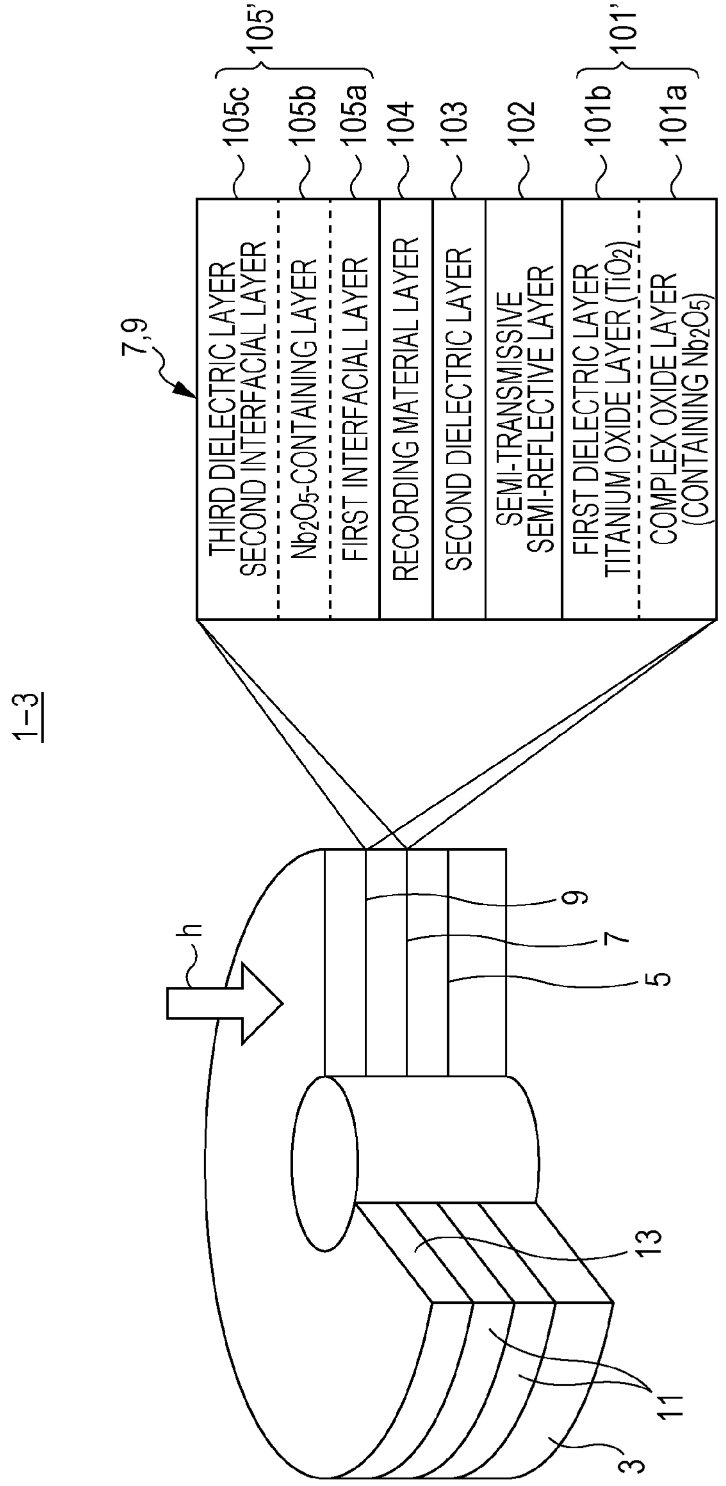
FIG. 7 is a schematic view showing a structure of an optical recording medium according to a third embodiment of the present disclosure.

FIG. 7 is a schematic view showing a configuration of an optical recording medium 1-3 according to a third embodiment. The optical recording medium 1-3 shown in this figure corresponds to the optical recording medium described in the second embodiment, in which a third dielectric layer 105' in each of the semi-transmissive recording layers 7 and 9 has a laminated structure including a layer containing niobium oxide ($Nb_2O_5$) and a protective layer provided thereon. The other components are the same as in the second embodiment.

That is, in the third embodiment, the third dielectric layer 105' in each of the semi-transmissive recording layers 7 and 9 includes a first interfacial layer 105*a*, a layer containing niobium oxide ($Nb_2O_5$) (referred to as a "$Nb_2O_5$-containing layer") 105*b*, and a second interfacial layer 105*c* which are laminated on a support substrate 3 in order from the recording material layer 104 side.

Among these layers, the first interfacial layer 105*a* is a layer provided at an interface in contact with the recording material layer 104 and is formed using a material advantageous in view of the crystallization promoting effect and thermal conductivity control. As such a material, for example, silicon nitride ($Si_3N_4$) is used. If the $Nb_2O_5$-containing layer 105*b* using niobium oxide ($Nb_2O_5$) described below is composed of a material having the same effect as the interfacial layer, the third dielectric layer 105' may have a double-layer structure without the first interfacial layer 105*a*.

The $Nb_2O_5$-containing layer 105*b* is a layer using niobium oxide ($Nb_2O_5$) which has high light transmittance tc for the laser beam at a wavelength of 400 to 410 nm used for recording/reproduction. The $Nb_2O_5$-containing layer 105*b* may be composed of a complex oxide using another oxide together with niobium oxide ($Nb_2O_5$). The other oxide constituting the complex oxide together with niobium oxide ($Nb_2O_5$) is not limited, but, for example, gallium oxide ($Ga_2O_3$) or zirconium oxide ($ZrO_2$) is preferably used as a material which can maintain the light transmittance tc.

The second interfacial layer 105*c* is a layer formed using a material which suppresses, in the semi-transmissive recording layers 7 and 9, the occurrence of defects which may not be sufficiently suppressed only by the $Nb_2O_5$-containing layer 105*b* using niobium oxide ($Nb_2O_5$). Examples of such a material include bismuth oxide ($Bi_2O_3$), gallium oxide ($Ga_2O_3$), titanium oxide ($TiO_2$), and silicon nitride (SiN).

According to the third embodiment, in the configuration of the second embodiment, the third dielectric layer 105' is provided adjacent to the recording material layer 104, the third dielectric layer 105' including the second interfacial layer 105c laminated on the $Nb_2O_5$-containing layer 105b using niobium oxide ($Nb_2O_5$) having high light transmittance. Therefore, as shown in Example 5 below, the effect of further improving the light transmittance of the semi-transmissive recording layer 7, 9 and suppressing the occurrence of defects can be achieved as compared with the second embodiment. Therefore, in the phase-change optical recording medium 1-3, the storage capacity can be further increased.

EXAMPLE 5

Assuming the case where a laser beam at a wavelength of 405 nm as a recording/reproduction wavelength is used, the semi-transmissive recording layer 7, 9 described in the third embodiment was formed using each of various materials for the third dielectric layer 105'. The semi-transmissive recording layer 7, 9 was formed on the intermediate layer 11 composed of a photocurable resin and covered with the transparent protective film 13 composed of a photocurable resin.

The semi-transmissive recording layer was formed using the materials below in order from the support substrate side.

First dielectric layer 101 . . . titanium oxide ($TiO_2$) single layer

Semi-transmissive semi-reflective layer 102 . . . Ag alloy (10 nm)

Second dielectric layer 103 . . . complex oxide containing indium oxide

Recording material layer 104 . . . GeBiTe recording material (6 nm)

Third dielectric layer 105' . . . . Table 6 below

The GeBiTe recording material constituting the recording material layer 104 is a compound-type recording material and changes in phase between crystal and amorphous phases by laser irradiation.

For the semi-transmissive recording layer 7, 9 formed as described above, the light transmittance tc, the initial defect density, and the rate of defect increase were measured by the same method as in Example 1. The deposition rate of the second interfacial layer 105c and refractive index (wavelength 405 nm) are also shown in Table 6 above.

According to Table 6, it was confirmed that in the configuration of the third embodiment including the second interfacial layer 105c provided on the $Nb_2O_5$-containing layer 105b using niobium oxide ($Nb_2O_5$), the initial defect density is decreased. In particular, it was confirmed that when the second interfacial layer 105c is composed of titanium oxide ($TiO_2$), bismuth oxide ($Bi_2O_3$), silicon nitride (SiN), or gallium oxide ($Ga_2O_3$), the initial defect density and the rate of defect increase can be suppressed to two decimal places or less.

In contrast, in a configuration using cerium oxide ($CeO_2$) for the second interfacial layer 105c, an effect is obtained by providing the second interfacial layer 105c, but the initial defect density and the rate of defect increase are suppressed to one decimal place or less and are thus not a practical level.

Also, Table 6 indicates that in any one of the configurations, the light transmittance of about 60% is secured. This confirmed that bismuth oxide ($Bi_2O_3$), gallium oxide ($Ga_2O_3$), titanium oxide ($TiO_2$), or silicon nitride (SiN) is preferably used for the second interfacial layer 105c on the $Nb_2O_5$-containing layer 105b using niobium oxide ($Nb_2O_5$).

In a comparative configuration shown in Table 6 above in which the second interfacial layer 105c is omitted, when the transparent conductive film 13 is formed 1 hour after the formation of the third dielectric layer 105', initial defects are about 4 times as many as when the transparent protective film 13 is formed 10 minutes after. This indicates that from the viewpoint of securing reliability, it is important to form the second interfacial layer 105c as soon as possible after the formation of the $Nb_2O_5$-containing layer 105b using niobium oxide ($Nb_2O_5$).

Also, Table 6 indicates that the deposition rates of the materials other than titanium oxide ($TiO_2$) are 4 times as high as that of titanium oxide ($TiO_2$). Therefore, in a laminated structure using each of the other materials, the production tact time can be shortened as compared with the case in which a layer composed of titanium oxide ($TiO_2$) is provided in place of the $Nb_2O_5$-containing layer 105b and the second interfacial layer 105c in the third dielectric layer 105'.

TABLE 6

| Third dielectric layer 105' | | | Time up to formation of transparent protective film | Light transmittance tc % | Initial defect density defects/$mm^2$ | Rate of defect increase defects/$mm^2$/day | Refractive index (wavelength 405 nm) | Deposition rate ratio |
|---|---|---|---|---|---|---|---|---|
| First interfacial layer 105a | $Nb_2O_5$-containing layer 105b | Second interfacial layer 105c | | | | | | |
| $Si_3N_4$ | $Nb_2O_5$ | — | 10 min | 60 | 0.13 | 0.17 | 2.5 | 4 |
| | | — | 1 h | 60 | 0.49 | 0.15 | | |
| | | $TiO_2$ | 1 h | 61 | 0.02 | 0.05 | 2.7 | 1 |
| | | $Bi_2O_3$ | 1 h | 61 | 0.06 | 0.02 | 2.9 | 4 |
| | | SiNx | 1 h | 60 | 0.06 | 0.05 | 2.1 | 4 |
| | | $Ga_2O_3$ | 1 h | 60 | 0.06 | 0.06 | 1.9 | 4 |
| | | $CeO_2$ | 1 h | 60 | 0.23 | 0.20 | 2.7 | 4 |

EXAMPLE 6

As a comparative example of the third embodiment, the semi-transmissive recording layer 7, 9 including the third dielectric layer 105' with each of the configurations shown in Table 7 below was formed. The configuration is the same as in Example 5 except the third dielectric layer 105'.

TABLE 7

| Third dielectric layer 105' | | | | Light | Initial defect | Rate of defect |
|---|---|---|---|---|---|---|
| Interfacial layer 105a | Intermediate layer 105b | Protective layer 105c | i-MLSE | transmittance tc % | density defects/mm$^2$ | increase defects/mm$^2$/day |
| $Si_3N_4$ | $Nb_2O_5$ | | 11.5 | 60 | 0.18 | 0.55 |
| | $TiO_2$ | | 12.5 | 60 | 0.15 | 0.05 |
| | $Bi_2O_3$ | | 22.0 | 59 | 0.08 | 6.91 |
| | $Ga_2O_3$ | | 11.4 | 50 | 0.08 | 0.21 |
| | $SiN_x$ | | 12.3 | 56 | 0.07 | 0.08 |

For the semi-transmissive recording layer 7, 9 formed as described above, the light transmittance tc, the initial defect density, and the rate of defect increase were measured by the same method as in Example 1. Also, i-MLSE (Maximum Likelihood Sequence Estimation) (signal characteristics) was measured as reproduced signal quality of recorded information. The i-MLSE is an evaluation index used for evaluating a RF signal with a data capacity of 32.0 Gb to 33.4 GB per information layer of Blu-ray Disc. The signal recording conditions included a channel clock of 132 MHz, and a channel bit length of 55.87 nm. Since, for the optical recording media formed, the configuration of the recording layer was not optimized so as to sufficiently exhibit characteristics for each of the dielectric materials, values of i-MLSE (signal characteristics) of 13% or less were evaluated as "good".

Table 7 indicates that the optical recording medium using bismuth oxide ($Bi_2O_3$) in the third dielectric layer 105' has extremely bad signal characteristics. This is due to the fact that bismuth oxide ($Bi_2O_3$) is a material having the very low thermal conductivity, and thus a record mark may not be easily formed because heat is excessively accumulated during recording in the phase-change recording material layer used. Therefore, the phase-change recording material layer in which an amorphous mark region is formed by rapid cooling is put in a undesirable state. Consequently, a rate of defect increase is extremely worsened.

On the other hand, when gallium oxide ($Ga_2O_3$) or silicon nitride (SiN) is used, the signal characteristics can be secured, but the light transmittance is decreased. This is due to a low refractive index. However, when high light transmittance is desired, gallium oxide ($Ga_2O_3$) and silicon nitride (SiN) are unsuitable materials.

In addition, with gallium oxide ($Ga_2O_3$), the rate of defect increase is slightly high and exceeds a practical range. In the case of titanium oxide ($TiO_2$), the signal characteristics can be secured, but as described above, the production efficiency is decreased due to the very low deposition rate of titanium oxide ($TiO_2$). In the case of niobium oxide ($Nb_2O_5$), the signal characteristics are good, but the initial problem of increasing defects occurs.

The present disclosure contains subject matter related to that disclosed in Japanese Priority Patent Application JP 2010-170887 filed in the Japan Patent Office on Jul. 29, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium comprising:

a support substrate; and a semi-transmissive recording layer including a first dielectric layer, a semi-transmissive semi-reflective layer, a second dielectric layer, a phase-change recording material layer, and a third dielectric layer which are laminated (i) in that order from the support substrate side, and (ii) with no other layers in between, wherein, the semi-transmissive semi-reflective layer is composed of silver, and the first dielectric layer includes a composite oxide layer containing niobium oxide.

2. The optical recording medium according to claim 1, wherein the complex oxide layer contains niobium oxide and gallium oxide or zirconium oxide.

3. The optical recording medium according to claim 1, wherein the first dielectric layer includes a titanium oxide layer provided on the semi-transmissive semi-reflective layer side of the complex oxide layer.

4. The optical recording medium according to claim 1, wherein the third dielectric layer has a laminated structure including a niobium oxide layer on the support substrate side and a layer which protects the niobium oxide layer.

5. The optical recording medium according to claim 4, wherein the protective layer is composed of bismuth oxide, gallium oxide, titanium oxide, or silicon nitride.

* * * * *